United States Patent [19]

Bilow et al.

[11] 4,276,407

[45] Jun. 30, 1981

[54] ACETYLENE TERMINATED IMIDE OLIGOMERS WHICH MELT AT LOW TEMPERATURES

[75] Inventors: Norman Bilow, Encino; Abraham L. Landis, Northridge, both of Calif.

[73] Assignee: Hughes Aircraft Company, Culver City, Calif.

[21] Appl. No.: 66,985

[22] Filed: Aug. 16, 1979

[51] Int. Cl.$^3$ .................. C08G 73/10; C08G 73/12
[52] U.S. Cl. .................. 528/172; 260/30.4 N; 526/259; 526/262; 528/125; 528/128; 528/170; 528/183; 528/185; 528/352; 528/353
[58] Field of Search .............. 528/125, 128, 170, 185, 528/188, 352, 353, 172; 526/259, 262

[56] References Cited

U.S. PATENT DOCUMENTS

| | | | |
|---|---|---|---|
| 3,833,546 | 9/1974 | Takekoshi et al. | 528/172 X |
| 3,845,018 | 10/1974 | Bilow et al. | 528/128 X |
| 3,850,885 | 11/1974 | Takekoshi et al. | 528/172 X |
| 3,864,309 | 2/1975 | Bilow et al. | 528/183 |
| 3,879,349 | 4/1975 | Bilow et al. | 528/170 |
| 3,897,395 | 7/1975 | D'Alelio | 528/353 |
| 3,935,167 | 1/1976 | Marvel et al. | 528/125 |
| 3,989,670 | 11/1976 | Takekoshi et al. | 528/185 X |
| 3,991,004 | 11/1976 | Takekoshi et al. | 528/38 X |
| 3,998,786 | 12/1976 | D'Alelio | 528/353 |
| 4,058,505 | 11/1977 | D'Alelio | 526/259 |
| 4,075,171 | 2/1978 | D'Alelio | 528/353 |
| 4,098,767 | 7/1978 | Bilow | 526/262 |
| 4,100,138 | 7/1978 | Bilow et al. | 526/262 |
| 4,166,168 | 8/1979 | D'Alelio | 528/353 |
| 4,168,366 | 9/1979 | D'Alelio | 528/353 |
| 4,168,367 | 9/1979 | D'Alelio | 528/353 |
| 4,218,555 | 8/1980 | Antonoplos et al. | 528/172 X |

*Primary Examiner*—Howard E. Schain
*Attorney, Agent, or Firm*—B. T. Hogan, Jr.; W. H. MacAllister

[57] ABSTRACT

Improved diimide and polyimide oligomers containing phenylacetylene terminal groups have been produced which melt at low temperatures and are curable into useful laminating resins, molding compounds and matrix resins. These oligomers are analogous to diimides and polyimides made from conventional dianhydrides, such as benzophenonetetracarboxylic dianhydride or pyromellitic dianhydride.

12 Claims, No Drawings

ACETYLENE TERMINATED IMIDE OLIGOMERS WHICH MELT AT LOW TEMPERATURES

TECHNICAL FIELD

This invention relates generally to the field of organic polymers suitable for use as structural materials, adhesives and molding compounds. More specifically, the invention relates to the preparation of phenylacetylene terminated thermosetting imide oligomers which cure by addition reactions, without the formation of gaseous by-products which cause voids, to yield thermally stable high-strength resins, adhesives and composite materials.

CROSS REFERENCE TO RELATED APPLICATIONS

U.S. Application Ser. No. 571,128 filed Apr. 24, 1975 by applicants herein discloses diimides prepared from conventional dianhydrides. This application is presently involved in Interference No. 100,079.

U.S. Application Ser. No. 16,451 filed Mar. 5, 1979 by Leroy J. Miller and applicants Bilow and Landis herein discloses the homopolymerization of acetylene substituted polyimide oligomers prepared from conventional dianhydrides. This application is a re-issue application of U.S. Pat. No. 3,879,349 presently involved in Interference No. 100,078.

BACKGROUND ART

Applicants herein and others have conducted extensive research intended to yield curable precursors which exhibit high-temperature stability, good structural strength and cure without the production of gaseous by-products to produce void-free resin composites and molding compounds. It has long been known that polyimides exhibit certain desirable high temperature characteristics and good structural strength. However, these prior art materials where generally cured by condensation reactions and therefore resulted in cured products which contained voids. As a result of the prior work of Applicants herein, it was discovered that the reaction product of conventional dianhydrides with aminophenylacetylenes, with or without diamines, produced acetylene-terminated polyimide precursors which exhibited desirable characteristics insofar as these materials yielded essentially void-free products when cured. However, these precursors exhibit relatively high melting points and as such are difficult to process.

Other attempts to make processable polyimide or diimide precursors have resulted in similar results in that the products made from propargyl terminated polyimides or diimides are high melting and are generally intractable. See, for example, U.S. Pat. Nos. 3,897,395 and 3,998,786 issued to Gaetano Francis D'Alelio. The D'Alelio Patents disclose polyimides derived from a vast shopping list of reactants. However, an examination of the D'Alelio disclosures will reveal that the products prepared exhibit very high melting points and are generally insoluble in conventional solvents.

In the closest known prior art, acetylene substituted diimides have been made from the dianhydrides benzophenonetetracarboxylic dianhydride and pyromellitic dianhydride. Typical acetylenic diimides of this type are shown below:

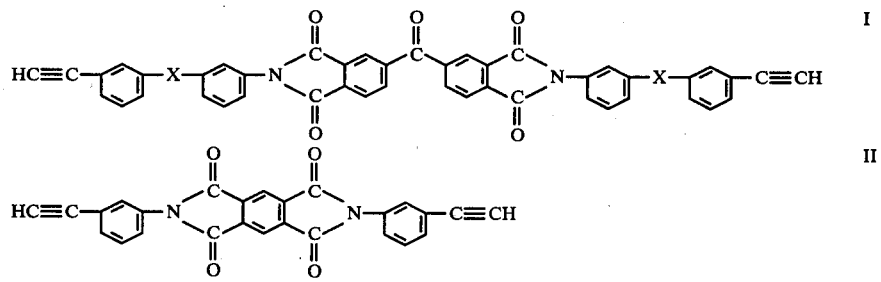

These prior art compounds melt at temperatures in excess of 200° C.

Prior art acetylene substituted-polyimide oligomers which are derived from three components generally melt at temperatures in the order of 196° C. to 200° C. and are represented by the following general structure:

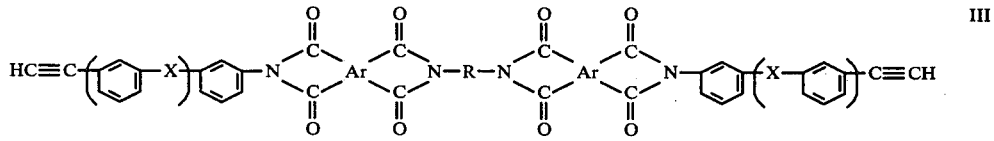

where Ar is derived from conventional dianhydrides and R is derived from a polyaryl diamine.

These prior art diimide and polyimide precursors are limited in their usefulness because of their high melting points and general insolubilities in conventional solvents. Therefore, Applicants herein and others, have conducted studies that are designed to obtain diimide and polyimide precursors having low melting points and high solubilities in conventional solvents. Low melting points and increased solubilities in conventional low boiling solvents are sought to facilitate the processing of these materials are resins for composites, molding compounds and/or adhesives.

SUMMARY OF THE INVENTION

A general purpose of the present invention is to provide thermosetting oligomers which cure into high strength, thermally stable, resins that are suitable for used as adhesives, and molding compounds and which can be used in the fabrication of composite structural materials.

While seeking to achieve the above-stated purpose and at the same time avoid the above disadvantages of the prior art, while retaining most if not all of the advantages thereof, we have invented a new class of phenylacetylene terminated diimide and polyimide oligomers which exhibit relatively low melting points, are soluble in conventional low boiling solvents and are curable by addition reactions into thermally stable high-strength resins.

The polymerizable imides of this invention may be represented by the structure

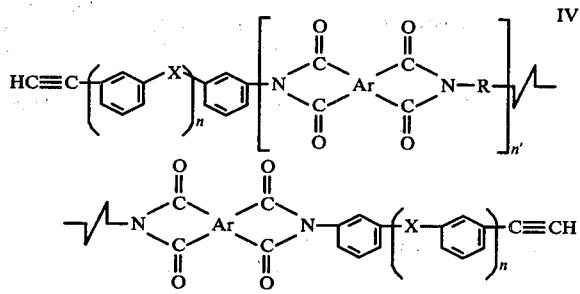

where Ar is a tetravalent organic moiety having the structure

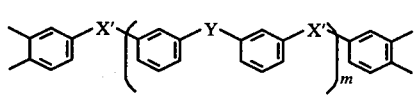

and R is a divalent organic moiety having the structure

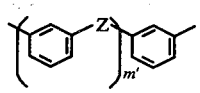

The compounds of this invention are derived either by the reaction of an aminoarylacetylene with a dianhydride whose structure is

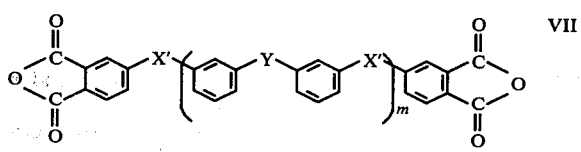

or by the reaction of a stoichiometric excess of a dianhydride whose structure is shown above, with an aryldiamine to form an anhydride capped polyamic acid which is in turn reacted with an aminoarylacetylene.

Accordingly, it is an objective of this invention to provide acetylene-substituted imide oligomers which exhibit substantially lower melting points than state of the art acetylene-substituted polyimide oligomers.

An additional objective of this invention is to provide acetylene-substituted imide oligomers that are soluble in low boiling conventional solvents.

A still further objective of this invention is to provide easy-to-process acetylene-substituted imide oligomers with better flow characteristics and longer gel times than prior art and conventional polyimide oligomers.

And, a further purpose is to provide imide oligomers which cure via addition reactions into thermosetting resins which exhibit high structural strength and high thermal stabilities.

That we obtain these objectives and others will become readily apparent in the following detailed description of the invention.

DETAILED DESCRIPTION OF THE INVENTION

It has been discovered that acetylene-terminated diimide oligomers and acetylene-terminated polyimide oligomers can be prepared from R bisphthalic anhydrides which exhibit substantially lower melting points, are soluble in conventional low-boiling solvents, exhibit good flow characteristics and exhibit longer gel times than previously exhibited by prior art oligomers prepared from conventional dianhydrides.

By the term "R bisphthalic anhydride" we mean a dianhydride having at least two anhydride groups joined together by a series of phenylene groups separated from each other by alternating R substituents selected from the group consisting of oxygen, sulfur, hexafluoroisopropylidene or carbonyl groups. Dianhydrides of this class may be represented by the following structure

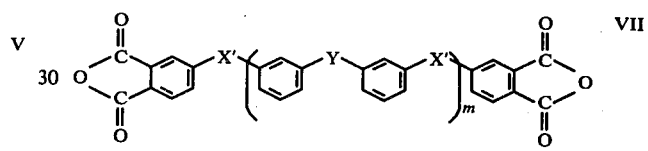

where $X'$ or $Y$ may be O, S, $C(CF_3)_2$, CO, or $CH_2$ and $m$ is at least 1.

Dianhydrides belonging to the class of compounds shown in structure VII may be prepared in accordance to the teachings of U.S. Pat. Nos. 3,833,546; 3,850,885; 3,989,670 and 3,991,004 all issued to Tohru Takekoshi et al and assigned to General Electric Company. The teachings of these patents are incorporated herein, by reference, to provide methods for preparing compounds of the class shown in formula VII.

A generalized reaction sequence for preparing dianhydrides found to be useful in this invention is shown below:

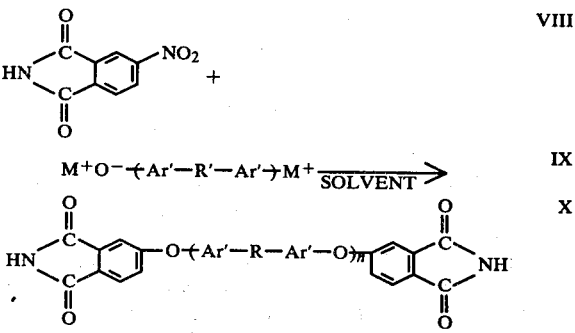

where $M^+$ is a positively charged atom of an alkali metal, $Ar'$ is phenylene, $R'$ is O, S, $C(CF_3)_2$, CO, or $CH_2$ and n ranges from 1 to 3. Na or K metals are preferred.

Compound X is then treated with a strong base to form a tetracarboxylic acid as follows;

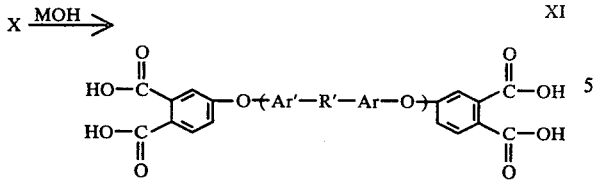

Finally the tetracarboxylic acid (XI is heated to yield the desired dianhydride.

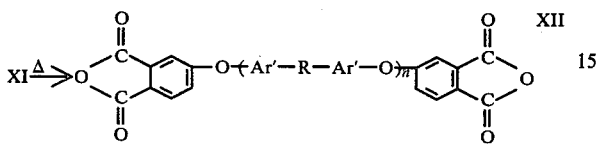

Diimide oligomers of this invention are prepared by reacting an aminoarylacetylene with a dianhydride of this structure shown above in a solvent under reflux conditions.

Suitable aminoarylacetylenes are those having the structure:

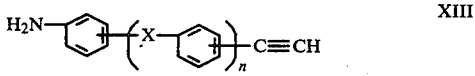

where X is O, S, $CH_2$, $SO_2$, $CH_2$, CO and $C(CF_3)_2$ and wherein n may range from 0 to about 4. However, we prefer to utilize aminoarylacetylene where X is O or S and n is at least 1. Meta substituted compounds are also preferred because of their tendency to yield lower melting products.

Diimide oligomers prepared from these materials have the following structure

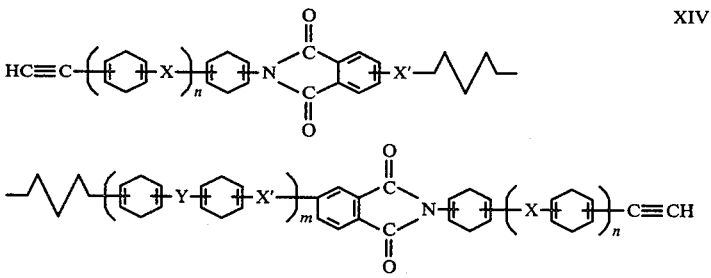

Specific examples of the production of diimides in accordance with this invention are shown below:

EXAMPLE I

Synthesis of a Diimide from 3-Aminophenylacetylene & Bis 4-(3,4-dicarboxyphenoxyphenyl) sulfide Dianhydride in a 2:1 Molar Ratio.

A solution of 3-aminophenylacetylene (3.54 grams, 0.0316 mole) in 30 ml of N-methylpyrrolidinone was added all at once to a solution of 4-(3,4-dicarboxyphenoxyphenyl) sulfide dianhydride (7.70 grams, 0.0158 mole) in 75 ml of N-methylpyrrolidinone. Enough benzene was then added so that the pot temperature was 150°-151° C. during reflux. The mixture was heated at a vigorous reflux rate for 5 hours employing a Dean-Stark water trap to remove the water. The solvent was removed using a rotary film evaporator and the oligomer was triturated with ethanol several times and dried at 100° C. for 4 hours in vacuum. A yield of 7.7 grams of oligomer, melting at 140°-142° C. was obtained.

EXAMPLE II

This example is similar to Example I except that p-aminophenylacetylene was used in place of m-aminophenylacetylene. The diimide obtained from the raction melted between 150° and 160° C. It differs from Example I only to the extent that dry tetrahydrafurane was used as the solvent during the amic acid formation whereas immidization was subsequently carried out in acetic anhydride.

EXAMPLE III

Samples of the oligomers from examples 1 and 2 were heated to 220° C. and found to polymerize into tough resinous products.

EXAMPLE IV

This example is similar to Example I except that m-aminophenoxyphenylacetylene (0.0316 mole) is used in place of m-aminophenylacetylene.

EXAMPLE V

A solution of 3-aminophenylacetylene (3.30, 0.0282 mole) in N-methylpyrrolidinone (20 ml.) was added all at once to a solution of bis [4-(3,4-dicarboxyphenoxy)-phenyl]hexafluoroisopropylidene dianhydride (8.85 g, 0.0141 mole) in N-methyl pyrrolidinone (25 ml.). Sufficient benzene was added so that the pot temperature was 150° C. when the mixture was heated under total reflux. After 6-7 hours at total reflux, during which time evolved water was collected in an azeotropic trap, the solvent was removed by evaporation on a rotary film evaporator. The oligomer was triturated with ethanol several times and then dried at 100° C. for 3 hours in vacuum. The yield was 8 g.

Polyimides of this invention may also be prepared by first reacting an aryldiamine such as bisaminophenoxybenzene with twice as many moles of the dianhydride of structure No. VII in a suitable solvent and subsequently reacting product of the the first reaction with a theoretical amount or a slight excess amount of an aminoarylacetylene.

An oligomer having the structure shown at IV on page 4 will be formed where n' is at least 1. In such an instance R is a divalent moiety whose structure is

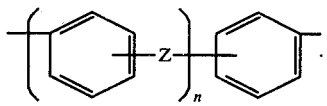

where Z is as defined below and n may range from 0 to 4.

Aryldiamines suitable for use in this invention may be selected from the group whose structure is

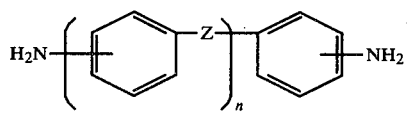

XVI where Z is S, O, $CH_2$, $>C(CF_3)_2$, $>C(CH_3)_2$ $SO_2$, CO, $C_6H_4$, $-C_6H_4-Y'-C_6H_4-$, or $-Y'-C_6H_4-Y'-C_6H_4-Y'-$ where $Y'$ is S, O, $CH_2$, $>C(CF_3)_2$, $>C(CH_3)_2$, $SO_2$ or mixtures thereof. In many cases, it is preferable to select a primary diamine having a meta substitution in order to enhance the preparation of a low melting oligomer.

When these diamines are employed with the novel dianhydrides of Structure VII and an aminoarylacetylene, oligomers of the class shown by structure IV where n is $\geq 1$ are formed by this invention.

Specific examples of the preparation of polyimides in accordance with this invention are shown below:

EXAMPLE VI

Preparation of an Acetylene-terminated Polyimide Oligomer from the Reaction of 3-Aminophenylacetylene; 1,3-Bis (3-Aminophenoxy)benzene and Bis [4-(3,4-dicarboxyphenoxy)phenyl] sulfide dianhydride in a 2:1:2 Molar Ratio A solution of 1,3-bis(3-aminophenoxy) benzene (2.06 grams, 0.00705 mole) in N-methylpyrrolidinone (35 ml) was added dropwise to a solution of bis [4-(3,4-dicarboxyphenoxy)phenyl] sulfide dianhydride (7.20 grams, 0.0141 mole) in N-methylpyrrolidinone (25 ml). After reacting for 2 hours, 3-aminophenylacetylene (1.65 g, 0.141 mole) was added all at once. Sufficient benzene was added so that the pot temperature was 149°–150° C. at total reflux. The mixture was heated at a vigorous reflux rate for 6.5 hours employing a Dean Stark trap to remove the water formed during the imidization. The solvent was removed by evaporation on a rotary film evaporator and the oligomer was triturated with ethanol several times and dried at 100° C. for 3 hours in vacuum. The yield was 9.7 grams, and the oligomer melted at 132°–134° C. A sample was shown to cure when it was heated at 250° C. The oligomer was found to be soluble in tetrahydrofuran.

EXAMPLE VII

Preparation of an Acetylene-terminated Polyimide Oligomer from the Reaction of 3-Aminophenylacetylene; 1,3-Bis (3-Aminophenoxy)benzene and Bis [4-(3,4-dicarboxyphenoxy)phenyl] hexafluoroisopropylidene in a 2:1:2 Molar Ratio A solution of 1,3-bis(3-aminophenoxy) benzene (2.06 grams 0.00705 mole) in N-methylpyrrolidinone (35 ml.) was added dropwise to a solution of 2,2-bis [4-(3,4-dicarboxyphenoxy)phenyl] hexafluoroisopropylidene dianhydride (8.85 g., 0.0141 mole) in N-methylpyrrolidinone (25 ml.). After reacting for 2 hours, 3-aminophenylacetylene (1.865 g, 0.0141 mole) was added all at once. Sufficient benzene was added so that the pot temperature was 149°–150° C. at total reflux. The mixture was heated at a vigorous reflux rate for 6.5 hours employing a Dean Stark trap to remove the water formed during the imidization. The solvent was removed by evaporation on a rotary film evaporator and the oligomer was triturated with ethanol several times and dried at 100° C. for 3 hours in vacuum. The yield was 11.3 grams, and the oligomer melted at 160° C. A sample was shown to cure when it was heated at 250° C. The oligomer was found to be soluble in tetrahydrofuran.

INDUSTRIAL APPLICABILITY

Compounds prepared in accordance with the above-described process are suitable for use in the fabrication of composite structural materials which exhibit high strengths, good thermal stability, excellent aging characteristics and are void free.

Inasmuch as the oligomers of this invention exhibit lower melting points than prior art polyimide oligomers, and are soluble in low boiling solvents, they are easier to process into useful articles of manufacture.

Having completely described our invention and having provided teachings to enable others to make and use our invention, the scope of our claims may now be understood as follows:

We claim:

1. A phenylacetylene terminated imide oligomer having the structure

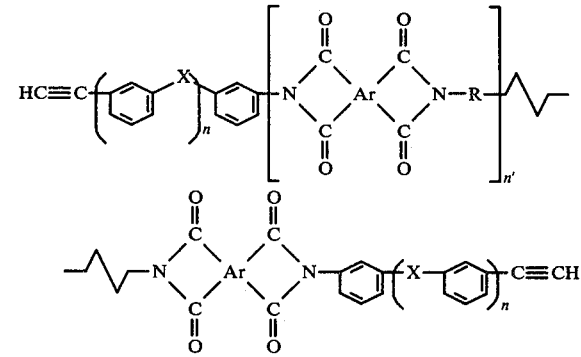

where X is O, S, $CH_2$, $SO_2$, CO, or $C(CF_3)_2$, Ar is a tetravalent organic moiety having the structure

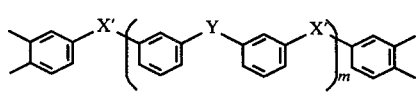

R is a divalent organic moiety having the structure

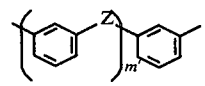

wherein $X'$ is O, S, $>C(CF_3)_2$, CO, or $CH_2$, Y is O, S, $>C(CF_3)_2$, CO, or $CH_2$, m is at least 1, Z is S, O, $CH_2$, >C(CF$_3$)$_2$, >C(CH$_3$)$_2$, CO, SO$_2$, C$_6$H$_4$, —C$_6$H$_4$—Y'—C$_6$H$_4$—, or —Y'—C$_6$H$_4$—Y'—C$_6$H$_4$—Y' wherein Y' is S, O, CH$_2$, >C(CF$_3$)$_2$, >C(CH$_3$)$_2$, SO$_2$ or mixtures thereof and where n ranges from 0 to 4, n' ranges from 0 to 4, m' ranges from 0 to 2.

2. An oligomer of claim 1 wherein n' is 1.
3. An oligomer of claim 2 wherein n is 0 or 1.
4. An oligomer of claim 3 wherein m' is 2 and Z is O.
5. An oligomer of claim 4 wherein X' is O and Y is S.
6. An oligomer of claim 1 wherein n' is 0.
7. An oligomer of claim 6 wherein n is 0 or 1 and X is O.
8. An oligomer of claim 6 wherein n is 1, X is O, and Y is S.
9. A phenylacetylene terminated imide oligomer having the structure

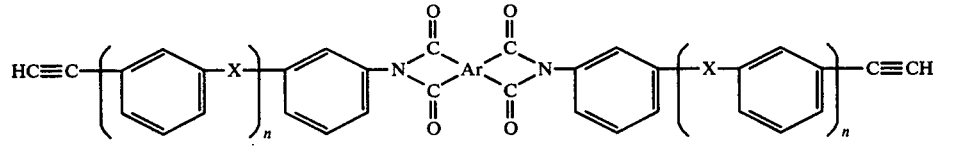

where n ranges from 0 to 4, X is O, S, CH$_2$, SO$_2$, CO or >C(CF$_3$)$_2$ and Ar is a tetravalent organic moiety having the structure

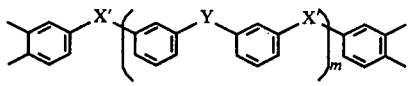

wherein m is at least 1, X' is O, S, >C(CF$_3$)$_2$, CO or CH$_2$ and Y is O, S, >C(CF$_3$)$_2$ or CH$_2$.

10. An oligomer of claim 9 wherein n is 1 and X is O.
11. An oligomer of claim 10 wherein X' is O and Y is S.
12. An oligomer of claim 10 wherein X' is O and Y is >C(CF$_3$)$_2$.

* * * * *

UNITED STATES PATENT AND TRADEMARK OFFICE
CERTIFICATE OF CORRECTION

PATENT NO. : 4,276,407
DATED : 30 June 1981
INVENTOR(S) : Norman Bilow, et al.

It is certified that error appears in the above-identified patent and that said Letters Patent are hereby corrected as shown below:

On the title page, Item [75] should read:
Norman Bilow, Encino; Abraham L. Landis, Northridge; Robert H. Boschan, Los Angeles, all of California.

Signed and Sealed this

Third Day of November 1981

[SEAL]

Attest:

GERALD J. MOSSINGHOFF

Attesting Officer     Commissioner of Patents and Trademarks